United States Patent
Mockry et al.

(10) Patent No.: US 8,833,741 B2
(45) Date of Patent: Sep. 16, 2014

(54) AIR-TO-AIR ATMOSPHERIC EXCHANGER

(75) Inventors: Eldon F. Mockry, Lenexa, KS (US); Ohler L. Kinney, Jr., Overland Park, KS (US); Kenneth P. Mortensen, Bonner Springs, KS (US); Kathryn L. Pullen, Lenexa, KS (US); Robert W. Petterson, Prairie Village, KS (US); William M. Roth, Lee's Summit, MO (US); Jidong Yang, Leawood, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 574 days.

(21) Appl. No.: 13/290,818

(22) Filed: Nov. 7, 2011

(65) Prior Publication Data

US 2013/0113126 A1    May 9, 2013

(51) Int. Cl.
*B01F 3/04*  (2006.01)
*F28D 15/00* (2006.01)
*F28F 13/12* (2006.01)

(52) U.S. Cl.
CPC ............ *F28F 13/12* (2013.01); *F28D 15/00* (2013.01); *Y10S 261/11* (2013.01)
USPC ............ 261/112.1; 261/112.2; 261/DIG. 11; 165/104.34

(58) Field of Classification Search
CPC .................................. F28D 15/00; F28F 13/12
USPC ............ 261/146, 148, 112.1, 112.2, DIG. 11; 165/104.34
See application file for complete search history.

(56) References Cited

U.S. PATENT DOCUMENTS

| | | | |
|---|---|---|---|
| 3,733,063 A * | 5/1973 | Loetel et al. | 261/112.2 |
| 5,147,583 A | 9/1992 | Bugler et al. | |
| 5,217,788 A | 6/1993 | Rye | |
| 6,206,350 B1 | 3/2001 | Harrison et al. | |
| 6,715,740 B2 | 4/2004 | Engh et al. | |
| 6,883,595 B2 | 4/2005 | Stratman et al. | |
| 7,328,886 B2 | 2/2008 | Mockry et al. | |
| 7,703,505 B2 * | 4/2010 | So et al. | 165/140 |
| 2005/0077637 A1 * | 4/2005 | Mockry et al. | 261/112.1 |
| 2010/0159209 A1 | 6/2010 | Mockry et al. | |
| 2011/0139419 A1 * | 6/2011 | Blomgren et al. | 165/170 |
| 2013/0113127 A1 * | 5/2013 | Yang et al. | 261/112.1 |

FOREIGN PATENT DOCUMENTS

DE    3002385 A1    9/1980

OTHER PUBLICATIONS

PCT International Search Report and Written Opinion mailed on Feb. 1, 2013 for PCT/US2012/063253.

* cited by examiner

*Primary Examiner* — Charles Bushey
(74) *Attorney, Agent, or Firm* — Baker & Hostetler LLP

(57) ABSTRACT

A sheet for use in a heat exchange apparatus. The sheet includes a first vertical rib that extends generally parallel to the vertical axis of the heat exchange apparatus. The sheet also includes a second vertical rib that extends, substantially all the way between the first and second edges of the sheet generally parallel to the first vertical rib. The sheet further includes a first horizontal rib that extends substantially all the way between the third and fourth edges of the sheet. The sheet additionally includes a second horizontal rib that extends substantially all the way between the third and fourth edges of the sheet generally parallel to the first horizontal rib.

21 Claims, 5 Drawing Sheets

AIR-TO-AIR ATMOSPHERIC EXCHANGER

FIELD OF THE INVENTION

The present invention relates generally to the reduction of cooling tower plume and/or water reclamation from cooling tower effluent or other heat rejection devices. More particularly, the present invention relates to method and apparatus for reducing the cooling tower plume and/or reclaiming water from cooling tower effluent to provide a source of clean water and reduce water consumption of the cooling tower.

BACKGROUND OF THE INVENTION

In electricity generation using steam driven turbines for example, water is heated by a burner to create steam which drives a turbine to creates electricity. In order to minimize the amount of clean water necessary for this process, the steam must be converted back into water, by removing heat, so that the water can be reused in the process. In air conditioning systems for large buildings for example, air inside the building is forced passed coils containing a cooled refrigerant gas thereby transferring heat from inside the building into the refrigerant gas. The warmed refrigerant is then piped outside the building where the excess heat must be removed from the refrigerant so that the refrigerant gas can be re-cooled and the cooling process continued.

In both of the foregoing processes, and numerous other processes that require the step of dissipating excess heat, cooling towers have been employed. In wet type cooling towers, water is pumped passed a condenser coil containing the heated steam, refrigerant, or other heated liquid or gas, thereby transferring heat into the water. The water is then pumped to the cooling tower and sprayed over a cooling tower media comprised of thin sheets of material or splash bars. As the water flows down the cooling tower media, ambient air is forced passed the heated water and heat is transmitted from the water to the air by both sensible and evaporative heat transfer. The air is then forced out of the cooling tower and dissipated into the surrounding air.

Cooling towers are highly efficient and cost effective means of dissipating this excess heat and thus are widely used for this purpose. A common drawback to cooling towers, however, is that under certain atmospheric conditions a plume can be created by moisture from the heated water source evaporating into the air stream being carried out of the top of the cooling tower. In heat dissipating arrangements where the cooling tower is very large, as in the case of power plants, the plume can cause low lying fog in the vicinity of the cooling tower. The plume can also cause icing on roads in the vicinity of the cooling tower where colder temperatures cause the moisture in the plume to freeze.

Efforts have therefore been made to limit or eliminate the plume caused by cooling towers. Examples of such efforts can be found in the art for example plume abated cooling tower are provided in which ambient air, in addition to being brought in at the bottom of the tower and forced upwards through a fill pack as hot water is sprayed down on the fill pack, is brought into the cooling tower through isolated heat conductive passageways below the hot water spray heads. These passageways which are made from a heat conductive material such as aluminum, copper, etc., allow the ambient air to absorb some of the heat without moisture being evaporated into the air. At the top of the tower the wet laden heated air and the dry heated air are mixed thereby reducing the plume.

Another example includes a plume prevention system in which the hot water is partially cooled before being provided to the cooling tower. The partial cooling of the hot water is performed using a separate heat exchanger operating with a separate cooling medium such as air or water. As discussed in the patent, the separate heat exchanger reduces the efficiency of the cooling tower and thus should only be employed when atmospheric conditions exist in which a plume would be created by the cooling tower.

In yet another example, a system may be employed where hot water is first pumped through a dry air cooling section where air is forced across heat exchange fins connected to the flow. The water, which has been partially cooled, is then sprayed over a fill pack positioned below the dry air cooling section and air is forced through the fill pack to further cool the water. The wet air is then forced upwards within the tower and mixed with the heated dry air from the dry cooling process and forced out the top of the tower.

While the foregoing systems provide useful solutions to the wet cooling tower plume problem, they require the construction of a complex, and often times costly, wet and dry air heat transfer mechanisms. A simple and inexpensive wet and dry air cooling mechanism is still needed wherein dry heated air and wet laden heated air can be mixed before passing out of the cooling tower to thereby reduce the plume.

Another recognized problem with cooling towers is that the water used for cooling can become concentrated with contaminates. As water evaporates out of the cooling tower, additional water is added but it should be readily recognized that contaminants in the water will become more concentrated because they are not removed with the evaporate. If chemicals are added to the cooling water to treat the water these chemicals can become highly concentrated which may be undesirable if released into the environment. If seawater or waste water is used to replace the evaporated water, a common practice where fresh water is not available or costly, salts and solids in the water can also build up in the cooling water circuit As these contaminants become more concentrated they can become caked in between the thin evaporating sheets diminishing the towers cooling efficiency.

To prevent the foregoing problem it is a regular practice to "blowdown" a portion of the water with the concentrated contaminants and replace it with fresh water from the source. While this prevents the contaminants in the cooling tower water from becoming too concentrated, there may be environmental consequences to discharging water during the blowdown process. Efforts have therefore been made to reduce the water consumption in cooling towers.

Another issue with cooling towers currently employed in the field is the desalination of sea water, and purification of other water supplies, to create potable drinking water. Numerous approaches have been developed to remove purified water from a moist air stream. The major commercial processes include Multi-Stage Flash Distillation, Multiple Effect Distillation, Vapor Compression Distillation, and Reverse Osmosis.

The foregoing show that there is a need for desalination systems for converting sea water, or other water supply containing high levels of contaminants, into a purer water supply. A simple and cost effective means of condensing the effluent of a cooling tower as a source of water would therefore be desirable.

SUMMARY OF THE INVENTION

A fill pack for use with a heat exchange apparatus having a first axis and a second axis, comprising:
a plurality of sheets, each sheet having first, second, third and fourth edges, wherein each sheet generally lies in a plane that is generally parallel to the first axis and said plurality of sheets combine to form a plurality of first conduits and a plurality of second conduits, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region;

at least one hardened corner, wherein said at least one hardened corner includes said plurality of first and second conduits wherein adjacent ones of said plurality of conduits contact one another and wherein at said first edge and said third edge are load bearing at said at least one hardened corner.

A fill pack having plurality of sheets each having first, second, third and fourth edges along, for use with a heat exchange apparatus having a first axis and a second axis, wherein each sheet generally lies in a plane that is generally parallel to the first axis and wherein the plurality of sheets combine to form a plurality of conduits, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region, and wherein said at least one generally planar region further comprises performance ribs disposed thereon at an angle to the first axis.

A plurality of sheets each having first, second, third and fourth edges along with first, second, third and fourth corners, for use with a heat exchange apparatus having a first and second axis, wherein the sheets generally lie in the first plane that is generally parallel to the first axis and said sheets combine to form conduits, comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region; and a seal connecting said first and said second sheets wherein said seal comprises a series of peaks that extend in a first direction away out of the plane, and a series of valleys that extend a second direction opposite said first direction, into the plane, to form a labyrinth geometry.

A method of producing a bonded sheet pair for a fill pack, comprising:

providing a plurality of individual sheets, wherein said plurality of sheets combine to form a plurality of conduits, said sheets each comprise:

each sheet having first, second, third and fourth edges along with first, second, third and fourth corners, wherein each sheet generally lies in a plane that is generally parallel to the first axis, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region;

at least one hardened corner, wherein said at least one hardened corner includes said plurality of conduits wherein adjacent ones of said plurality of conduits contact one another;

aligning the sheets so that they are in contact with each other at contact locations; and radio frequency (RF) welding the sheets together from opposite sides of the bonded sheet pair, to form a bonded sheet pair.

A method for condensing water utilizing a heat exchange fill pack for use with a heat exchange apparatus having a first axis and a second axis, comprising:

passing an air stream to be cooled through a plurality of first conduits, while concurrently passing a cooling air stream through a plurality of second conduits, the first and second conduits formed from a plurality of heat exchange sheets, each sheet having first, second, third and fourth edges along with first, second, third and fourth corners, wherein each sheet generally lies in a plane that is generally parallel to the first axis, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region; and at least one hardened corner, wherein said at least one hardened corner includes said plurality of first and second conduits wherein adjacent ones of said plurality of conduits contact one another; and condensing water from the air stream to be cooled.

A method for condensing water utilizing a heat exchange fill pack for use with a heat exchange apparatus having a first axis and a second axis, comprising:

passing an air stream to be cooled through a plurality of first conduits, while concurrently passing a cooling air stream through a plurality of second conduits, the first and second conduits formed from a plurality of heat exchange sheets, each sheet having first, second, third and fourth edges along with first, second, third and fourth corners, wherein each sheet generally lies in a plane that is generally parallel to the first axis, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region;

flowing an air stream over the sheet such that the performance ribs provide heat exchange; and condensing water from the air stream to be cooled.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a schematic representation of a heat exchanger in accordance with an embodiment of the present invention positioned in a cooling tower or the like.

DETAILED DESCRIPTION OF PREFERRED EMBODIMENTS OF THE INVENTION

Figure 1:
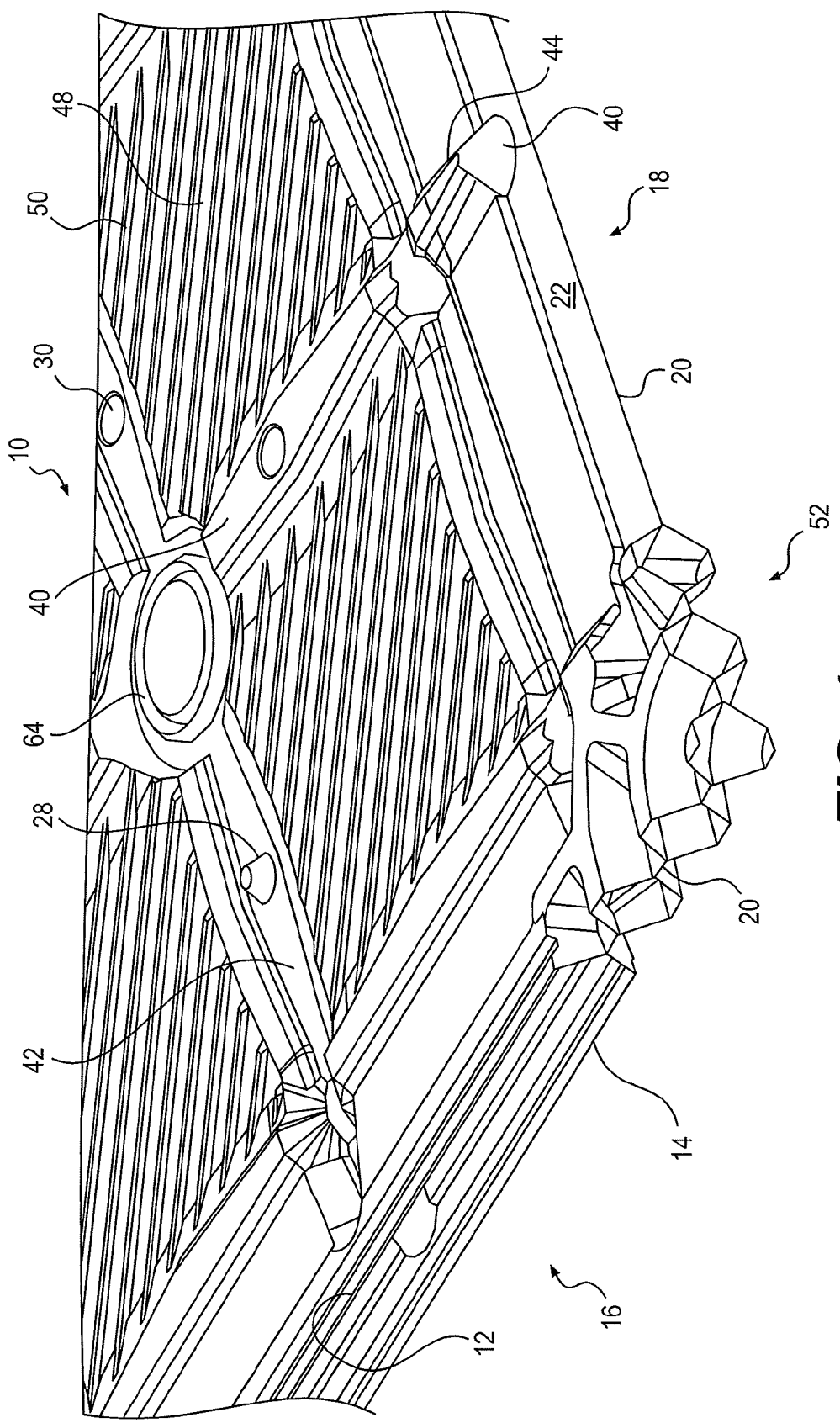
FIG. 1 is a perspective view of a portion of a heat exchange pack in accordance with an embodiment of the invention.
Figure 2:
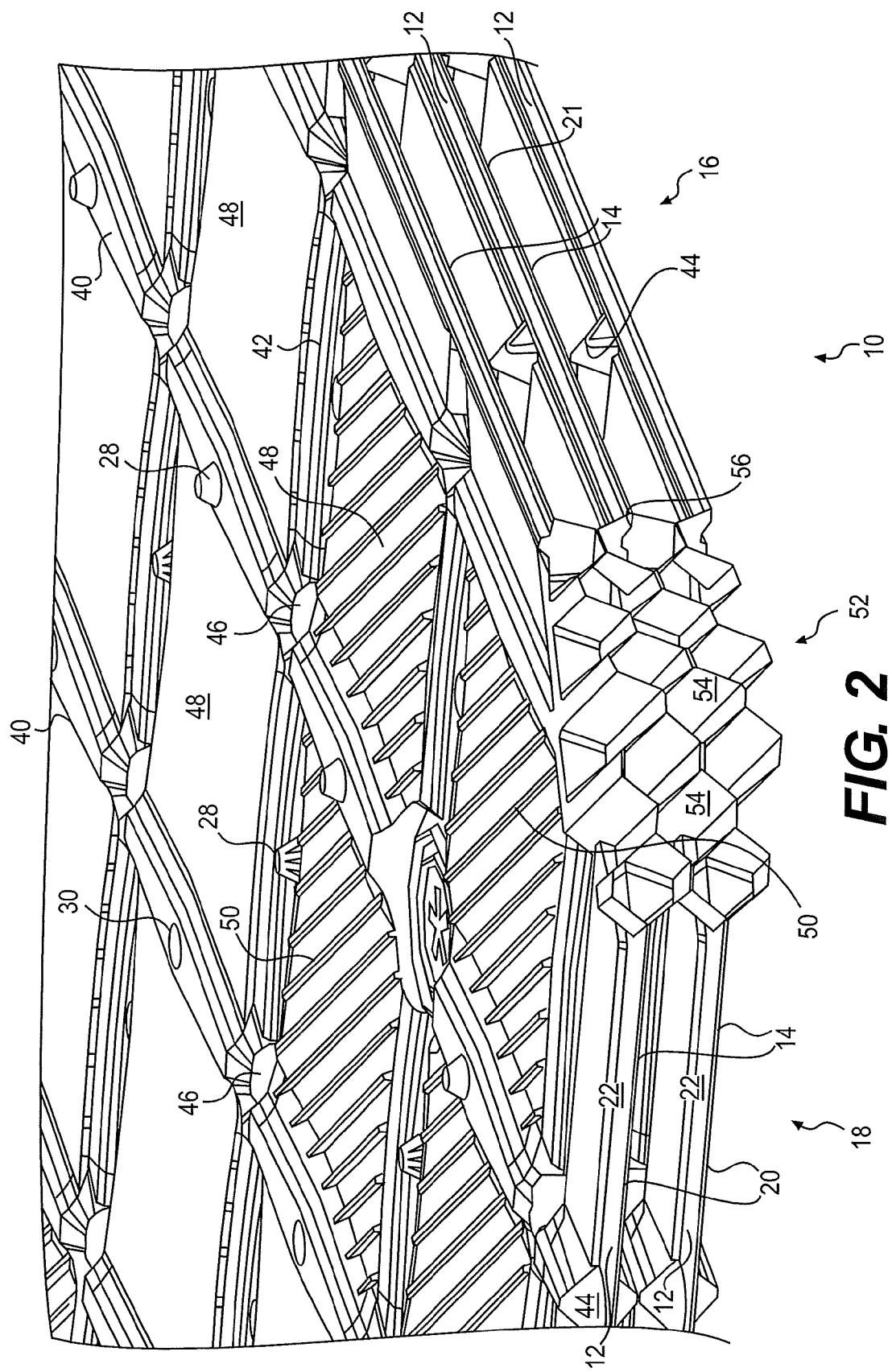
FIG. 2 is a perspective view of the heat exchange pack rotated in accordance with another embodiment of the present invention.

Referring now to the figures wherein like reference numerals indicate like elements, in FIGS. 1 and 2 a vapor condensing heat exchanger pack, generally designated 10, is illustrated in accordance with an embodiment of the present invention. As depicted, the heat exchanger pack 10 is constructed from a plurality of individual, thin heat exchange sheets, 12 and 14, respectively, that are connected or bonded to together to form the pack 10. The sheets 12, 14 may be made from various materials however in one example, the sheets 12, 14 are relatively thin synthetic resin material, for example, having a textured surface which will be discussed in further detail below. While two sheets 12, 14 are depicted for ease of description, embodiments of the present invention may include heat exchange packs that employ or use a plurality of individual heat exchange sheets. As illustrated in FIGS. 1 and 2, the pack has a first flow path 16 through the pack 10, i.e. passageways between sheets 12, 14, and a second flow path 18, over sheets 12 and under sheets 14. The aforementioned flow provides, and allows for two different airflow streams. In the embodiment depicted, the two air flow streams enter the heat exchanger pack at right angles to each other and are kept separate from one another by the sheets 12, 14.

As depicted in FIG. 1, to prevent the two air streams 16 and 18 from mixing during the heat exchange process, a seal 20 is formed in the thin synthetic resin sheets 12, 14 on a first edge. This seal is formed by the edges 22 of the thin sheets 12, 14, on one edge of the sheets 12, 14, wherein sheet 12 is depressed and sheet 14 is raised. The depressed and raised sheets, 12 and 14 respectively, meet in the center of the air passageways 16, or in other words, is depressed or raised one-half the width of the passageways 16. This edge seal 20 is parallel to the passageway 16 and therefore extends along the length of the air passageway 16 along the edges of entrance and exit of air passageways 18.

Similarly, another seal 21, opposite the seal 20 is formed by the raised edge of the thin sheet material 12 and the depressed edge of the thin sheet material 14, on the edge perpendicular to the seal 20, that meet in the center of the air passageway 18, or in other words, is depressed or raised one half the width of the passageway 18. Whereas seal 20 is bonded, the edge seal 21 is a compression fit. This edge seal 21 extends the length of the air passageway 18 along the edges of the entrance and exit to air passageway 16. Although not shown, the other edge of mating thin sheet material 12 and thin sheet material 14 parallel to seal 20 is similarly bonded. Thus, the perpendicular passageways 16 and 18 are formed within the heat exchanger pack 10.

As illustrated in the figures, one edge extends positively off of the formed sheet and the other downward or negatively. In this arrangement a single sheet component can be used to form the basis of the entire heat exchanger pack. This is accomplished when assembling the pack by stacking the sheets 12, 14 on top of one another and turning over every other sheet and locating it on the previous sheet. Although only three passageways are depicted, it should be readily recognized that in use the heat exchanger pack will have many perpendicular passageways and that any number of passageways can be formed using the sheets 12, 14 as disclosed herein.

To properly align sheets 12, 14, locator knobs or buttons 28, 30 are formed in the thin sheet material. Buttons 28, 30 from mating sheets 12, 14 nest one inside the other to correctly position sheets 12, 14. In a preferred embodiment, the buttons 28 that extend positively are conidial in shape having a flat top surface when viewed in the direction of the air flow through passageway 18.

The width of each of the passageways for either the cool air stream or the vapor laden air stream can be varied according to the design conditions of the particular task. Also, depending upon the orientation of the pack 10, the cool air passageway 18 and the vapor laden air passageway 16 do not necessarily have to be of equal widths.

As illustrated in FIGS. 1 and 2, the sheets 12, 14 include a first series of spaced apart, parallel ribs 40 that extend along the sheet 12,14, parallel to edge seals 21 and a second series of spaced apart, parallel ribs 42 that extend along the sheet 12, 14 parallel to seals 20. As illustrated in the top sheet 12, the first series of ribs 40 projects out of a plane in which the sheets lie, or out of the page of the drawing, as it extends along the sheet 12, 14 while the second series of ribs 42 project into the plane, or into the page of the drawing, as it extends along the sheets 12. As illustrated in FIGS. 1 and 2 each of the ribs 40, 42 preferably have tapered end regions 44.

As illustrated, the individual sheets of the heat exchanger packs 10 have a alternating configuration wherein adjacent sheets 12, 14 mirror one another. For example, the sheet 12 as illustrated in FIGS. 1 and 2 may simply be flipped over to become a sheet 14, in which case, the first series of ribs 40, which project out of the page, now extend into the page while the second series of ribs 42, which project into the page, now extend out of the page.

As depicted in FIGS. 1 and 2, the ribs 40, 42 are substantially continuous as they extend along the sheets 12, 14 in the horizontal and vertical directions, except for periodic interruptions located where the respective ribs 40, 42 intersect one another. As illustrated in the figures, the first series of ribs 40 and the second serious of ribs 42 intersect one another at preferably a 90 degree angle to one another, however the ribs 40, 42 may intersect at angles more or less than 90 degrees if desired. Furthermore, the ribs 40, 42 intersect one another at an intersection point or saddle 46. As illustrated in FIG. 2, the saddle 46 is a depression or dimple region that is disposed on the first series of ribs 40, wherein the saddle gradually projects a distance downward, into the plane in which the sheets lie, and then gradually upward out of the plane, to provide a round generally U-shaped depression or geometry on the saddle 46.

As illustrated in FIGS. 1 and 2, the saddles 46 are located at nearly every point of intersection of the ribs 40, 42. When a stack of sheets are assembled to form a heat exchanger pack 10 for example, the saddles 46 can function as load bearing regions for the adjacent individual sheets 12, 14 and for the heat exchanger pack 10 as a whole. The corner regions also assist and function with load bearing which will be discussed in further detail below. In the embodiments depicted, the saddles transfer various loads the sheets 12, 14 and/or heat exchanger pack 10 may experience during operation, by providing a direct load path through the individual sheets 12, 14 and through the heat exchanger pack 10. The aforementioned orientation of the saddles and the resulting direct load path, along with the corner geometry of the sheets 12, 14 provides strength and stability to the sheets 12, 14 and the heat exchanger pack 10. For example, in the illustrated embodiment, the saddles are arranged in an array which resists twisting of the pack, bending of the pack, and also resists collapsing of the individual air channels formed between the sheets of the pack. The saddle 46 shape provides an intersection with stiffness in the direction of both ribs. This permits effective load transfer between rib segments in either direction.

As previously described, the first series of ribs 40 extends along the sheets 12, 14 parallel to seal 21 and second series of ribs 42 extends along the sheets 12,14 parallel to seal 20 and intersect one another at the saddles 46. These intersections, provide a grid-like configuration on the sheets 12, 14, having a plurality of generally planar sections 48 that are located within the "borders" of the ribs. As illustrated in FIGS. 1 and 2, the planar sections 48 have a generally square configuration and extend between ribs 40 and ribs 42. The planar sections 48 combine with the ribs 40 and 42 to provide adjacent air flow paths or channels for the air streams to pass directly through the heat exchanger pack 10. The aforementioned flow channels also reduce the egress of air from one channel to an adjacent channel and vice versa, and provide single pathway for the air streams to flow through the pack 10 once the streams enter the heat exchanger pack 10.

The planar sections 48 are generally planar and provide a flat surface in the channels through which the air travels. The flat surface is interrupted by the ribs 40 and the ribs 42 that extend away from the plane, as previously described. As illustrated in FIGS. 1 and 2, while some embodiments of the present invention include planar sections 48 having a generally smooth geometry, alternative embodiments may include thermal performance enhancing ribs 50, for example. As depicted in FIGS. 1 and 2, the ribs 50 protrude into the dry path, preferably, to stir the air flow traversing along said path. As illustrated the ribs 50 are oriented or positioned at an angle to the air flow through the path. Preferably this angle ranges between approximately 20 degrees to approximately 90 degrees, and most preferably approximately 45 degrees. Also, the rib height may vary as a function of the dry path width. For example, rib 50 height may be 0.3 to 0.05 times the width of the dry path opening, and more preferably, 0.10 times the width height. Moreover, center to center spacing of the ribs 50 on the paths may vary from 5 to 20 times the rib height. Preferably, the spacing is approximately 10 times the rib 50 height.

As depicted in the figures, the ribs 50 may extend from one or both faces of the dry path passages. In embodiments utilizing ribs 50 on both faces, the ribs 50 on opposing faces may be parallel or at an angle to each other. Furthermore, when said ribs 50 are oriented in a parallel configuration, a stagger is desirable from one face to the other so as not to block too much of the opening at any given cross section. The rib's geometry may be triangular, square, rectilinear, oblong, etc. In one preferred embodiment, the shape is square. Long continuous ribs as shown are preferable for water drainage. However the ribs 50 may be divided in into a series of smaller discrete ribs.

In one embodiment of the present invention, preferred arrangement of the performance ribs 50 is to be vertical when the pack 10 is installed in a diamond configuration as a horizontal rib 50 orientation can cause them to fill with liquid and cause increased pressure drop. Accordingly, in the exemplary sheets 12 and sheets 14 depicted, each sheet differs from the other in that the ribs 50 are opposite hand so that the ribs 50 run or extend vertically in the diamond pack orientation. The aforementioned preferred vertical orientation of the performance ribs may, for example, be accomplished by utilizing separate unique vacuum molds to achieve the preferred vertical orientation.

Referring now to FIGS. 1 and 2, each sheet 12, 14 of the heat exchanger pack 10 has a four corner regions, each generally designated 52. The corner regions 52 each include a honeycomb, corrugated section or foot 54. As illustrated in FIG. 2, the corrugated section 54 is preferably honeycomb in geometry and that provides a stiff foot or base to support the gravity load and prevent bending or flexing of sheets 12, 14 of the pack 10.

Since moisture is condensed in the wet path, some condensate will run downward until it reaches the seal and then will run downward along the seal until it exits the tube. This seal must be water tight so as not to drip condensate into the dry air path ducting. While conventional glues and solvent welds may be used to provide the seals, in one embodiment said seals are preferably provided via radio frequency (RF) welding of mating tube halves. In one embodiment a RF welding machine may be used having metallic bars roughly the width of a peak and valley that will rest in the opposed peaks and valleys while RF energy is supplied therethrough. As energy is supplied to the bars, a thermal bond is formed at the touching regions. RF welding of a sheet pair in this method will typically be accomplished then by having an assembly of metal rods or bars that close on to the sheet pair from both sides of the sheet pair.

Figure 3:
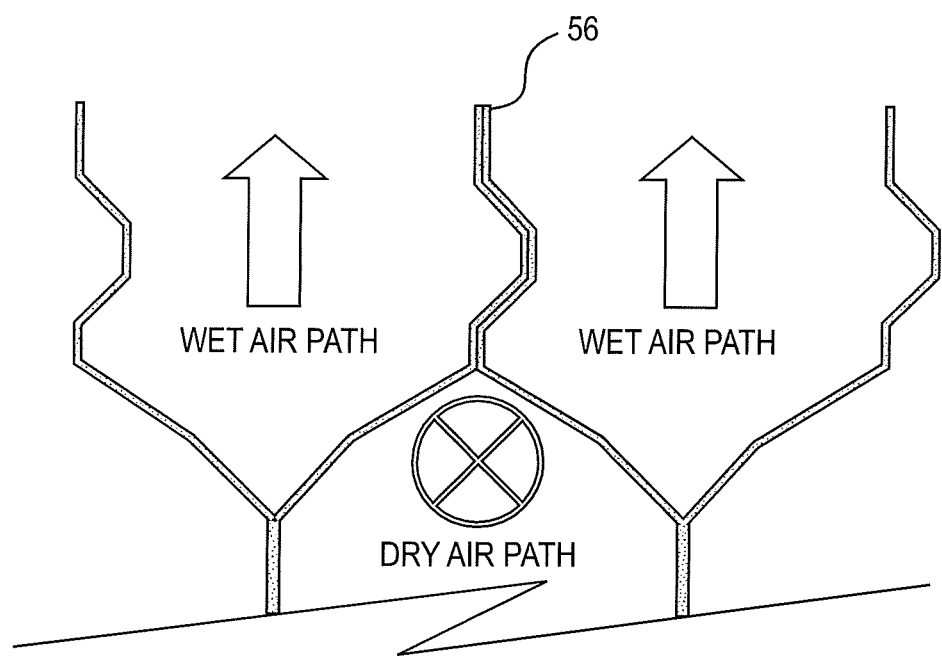
FIG. 3 is a schematic representation of a labyrinth seal in accordance with an embodiment of the present invention.

Referring to FIGS. 2 and 3, the dry path seal is clearly depicted, within the corners 52 having a labyrinth geometry 56. Due to the labyrinth geometry, the compression seal of one tube to the next creates a robust dry air path seal. This seal requires no adhesive or weld. The labyrinth seal provides a more tortuous path for leaking air to traverse than a flat surface contact. The labyrinth geometry creates a rib that stiffens the flat edge. The aforementioned stiffened surface is more robust in maintaining its shape when the sheets are pressed against each other.

Figure 4:
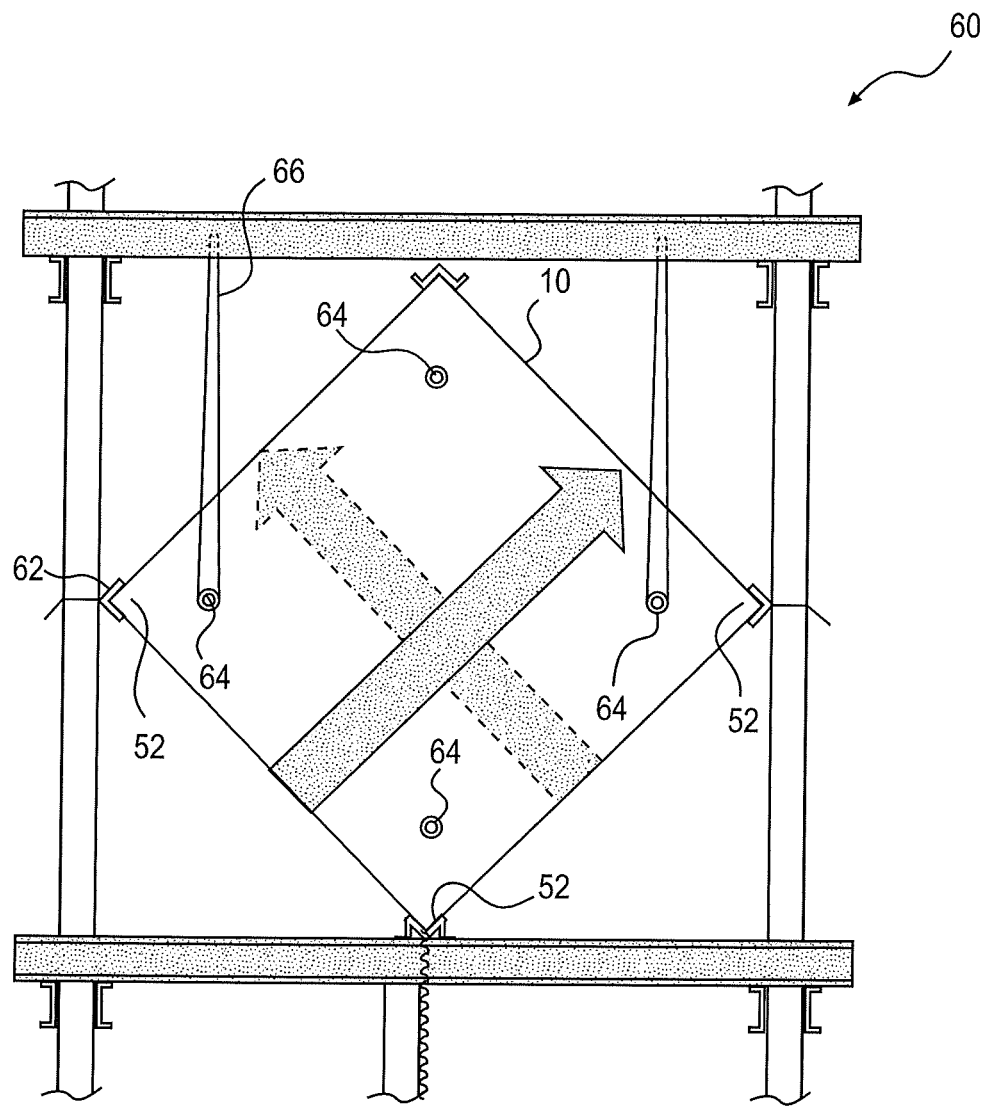

Referring now to FIG. 4, during operation, the corner 52 allows the individual fill packs to easily engage the support structure or frame assembly 60 of the cooling tower within which the heat exchanger is employed. The support structure or frame assembly 60 of the typically include cross beams or supports having generally planar surfaces upon with the individual heat exchanger packs sit or rest. For example, the frame assembly 60 may include corner supports 62 for receiving the corners 52 so that they are positioned in the tower in a preferred orientation. The aforementioned corrugated configuration of the corner 52, in combination with the corner supports 62 provides a stiff, support surface that easily rests on, or engages, the planar surface of the cross beams or supports of the cooling tower.

An alternative to or an addition to reinforcing the bottom corner is to provide welded sockets 64 in the in the sheets 12, 14 to permit insertion of supports (not pictured). Said supports may be of any geometry however one preferred embodiment employs round stainless steel pipe/tube supports. The aforementioned sockets 64 have been added and may be utilized should high temperatures (121° F. to 160° F.) or less stiff material such as polypropylene necessitate their use. Wire hangers, generally designated 66, extend upward from the stainless steel support tubes and are suspended from framing above the pack 10.

Figure 5:
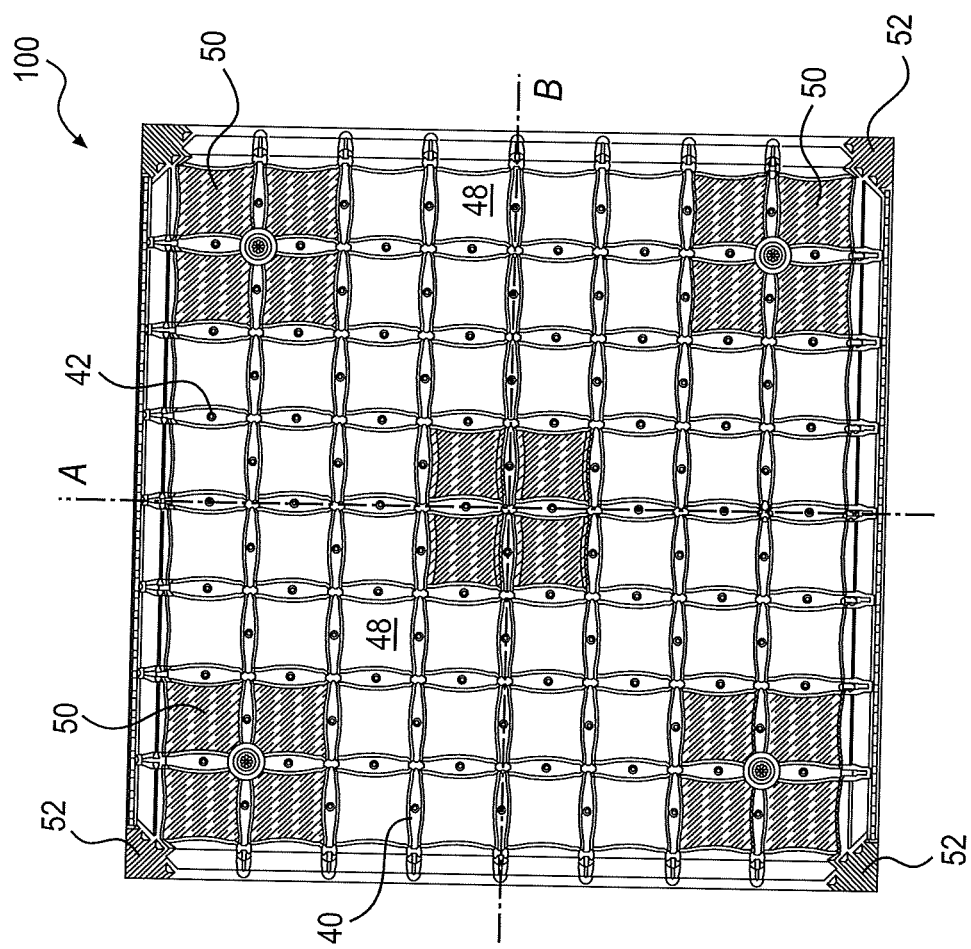
FIG. 5 is a plan view of a heat exchange sheet depicting the features of the sheet in accordance with an embodiment of the present invention.

Referring now to FIG. 5, a plan view of one of the sheets 12, 14, previously discussed in connection with FIGS. 1-4, is depicted. As previously discussed, the individual sheets have an alternating configuration wherein they mirror on another.

As previously discussed, the sheet 100 comprises a first series of spaced apart ribs 42 that extend along the sheet 12,14, parallel to edge seals 20 (not pictured) and generally parallel to the vertical axis A. The sheet also comprises a second series of ribs 40 that extend along the seal 21 (not pictured) generally parallel to the horizontal axis B, and perpendicular to the vertical axis A. As described in FIGS. 1-4, the first series of ribs 40 projects out of a plane in which the sheet 100 lies as it extends along the sheet 100, while the second series of ribs 42 project into the plane.

The sheet 100, as previously discussed has planar sections 48 are generally planar and provide a flat surface in the channels through which the air travels. The flat surface is interrupted by the ribs 40 and the ribs 42 that extend away from the plane, as previously described. As illustrated, these sections may include thermal performance enhancing ribs 50, for example. The ribs 50 protrude into the dry path, preferably, to stir the air flow traversing along said path. As illustrated the ribs 50 are oriented or positioned at an angle to the air flow through the path. Preferably this angle ranges between approximately 20 degrees to approximately 90 degrees, and most preferably approximately 45 degrees. During operation, the sheet 100 is rotated approximately forty-five degrees as part to a fill pack, and thus the ribs 50 extend generally parallel to the vertical axis A.

As previously discussed the ribs 50 on both faces, the ribs 50 on opposing faces may be parallel or at an angle to each other. Furthermore, when said ribs 50 are oriented in a parallel configuration, a stagger is desirable from one face to the other so as not to block too much of the opening at any given cross section. The rib's geometry may be triangular, square, rectilinear, oblong, etc. In one preferred embodiment, the shape is square. Long continuous ribs as shown are preferable for water drainage.

Also as previously discussed, the sheet 100 has four corner regions, each generally designated 52. The corner regions 52 each have a geometry such that when combined, the sheets provide a honeycomb, corrugated section or foot (not pictured) as described above.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fill pack for use with a heat exchange apparatus having a first axis and a second axis, comprising:
    a plurality of sheets, each sheet having first, second, third and fourth edges, wherein each sheet generally lies in a plane that is generally parallel to the first axis and said plurality of sheets combine to form a plurality of first conduits and a plurality of second conduits, each sheet further comprising:
    a first vertical rib that extends in a first direction generally parallel to the first axis along the sheet, substantially all the way between the first and second edges, wherein said first vertical rib protrudes in a second direction out of the plane;
    a second vertical rib that extends in the first direction along the sheet, substantially all the way between the first and second edges generally parallel to said first vertical rib, wherein said second vertical rib protrudes in the second direction out of the plane;
    a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;
    a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region;
    at least one hardened corner, wherein said at least one hardened corner includes said plurality of first and second conduits wherein adjacent ones of said plurality of conduits contact one another and wherein at said first edge and said third edge are load bearing at said at least one hardened corner.

2. The fill pack according to claim 1, further comprising a saddle region located at each of the intersections between said first vertical and horizontal ribs and said second vertical and horizontal ribs.

3. The fill pack according to claim 1, wherein said adjacent conduits that contact one another combine to form a honeycomb geometry.

4. The fill pack according to claim 1, wherein said at least one generally planar region further comprises performance ribs disposed thereon at an angle to the first axis.

5. The fill pack according to claim 4, wherein said angle is equal to approximately 20 degrees to approximately 90 degrees.

6. The fill pack according to claim 5, wherein said angle is equal to approximately 45 degrees.

7. The fill pack according to claim 1, wherein said first horizontal rib and said second horizontal rib each comprise:
    a first wall having a top region, a middle region and a lower region;
    a second wall having a top region, a middle region and a lower region; and
    a base that extends between said first wall and said second wall.

8. The fill pack according to claim 1, wherein said sheet is made of polyvinyl chloride (PVC).

9. The fill pack according to claim 3, wherein said honeycomb geometry of each hardened corner of each sheet is positioned so that the honeycomb geometries of adjacent sheets contact each other along a full face of adjacent honeycomb cells.

10. A plurality of sheets each having first, second, third and fourth edges along with first, second, third and fourth corners, for use with a heat exchange apparatus having a first and second axis, wherein the sheets generally lie in the first plane that is generally parallel to the first axis and said sheets combine to form conduits, comprising:
    a first vertical rib that extends in a first direction generally parallel to the first axis along the sheet, substantially all the way between the first and second edges, wherein said first vertical rib protrudes in a second direction out of the plane;
    a second vertical rib that extends in the first direction along the sheet, substantially all the way between the first and second edges generally parallel to said first vertical rib, wherein said second vertical rib protrudes in the second direction out of the plane;
    a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region; and a seal connecting said first and said second sheets wherein said seal comprises a series of peaks that extend in a first direction away out of the plane, and a series of valleys that extend a second direction opposite said first direction, into the plane, to form a labyrinth geometry.

11. The sheets according to claim 10, wherein each sheet further comprises at least one hardened corner, wherein said at least one hardened corner includes the plurality of conduits wherein adjacent ones of said plurality of conduits contact one another.

12. The sheets according to claim 10, each further comprising a saddle region located at each of the intersections between said first vertical and horizontal ribs and said second vertical and horizontal ribs.

13. The sheets according to claim 11, wherein adjacent conduits that contact one another combine to form a honeycomb geometry.

14. The sheets according to claim 10, wherein said at least one generally planar region further comprises performance ribs disposed thereon at an angle to the first axis.

15. The sheets according to claim 14, wherein said angle is equal to approximately 20 degrees to approximately 90 degrees.

16. The sheets according to claim 15, wherein said angle is equal to approximately 45 degrees.

17. The sheets according to claim 11, wherein said first edge and said third edge are load bearing at said at least one hardened corner.

18. A method for condensing water utilizing a heat exchange fill pack for use with a heat exchange apparatus having a first axis and a second axis, comprising:

passing an air stream to be cooled through a plurality of first conduits, while concurrently passing a cooling air stream through a plurality of second conduits, the first and second conduits formed from a plurality of heat exchange sheets, each sheet having first, second, third and fourth edges along with first, second, third and fourth corners, wherein each sheet generally lies in a plane that is generally parallel to the first axis, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region; and at least one hardened corner, wherein said at least one hardened corner includes said plurality of first and second conduits wherein adjacent ones of said plurality of conduits contact one another; and condensing water from the air stream to be cooled.

19. The method according to claim 18, wherein the at least one generally planar region includes performance ribs disposed thereon at an angle to the first axis, said method further comprising the step of passing the cooling air stream over the performance ribs.

20. The method accordingly to claim 19, wherein the performance ribs extend generally at a forty-five (45°) degree angle the first axis.

21. A fill pack for use with a heat exchange apparatus having a first axis and a second axis, comprising:

means for passing an air stream to be cooled through a plurality of first conduits, while concurrently passing a cooling air stream through a plurality of second conduits, the first and second conduits formed from a plurality of heat exchange sheets, each sheet having first, second, third and fourth edges along with first, second, third and fourth corners, wherein each sheet generally lies in a plane that is generally parallel to the first axis, each sheet further comprising:

a first vertical rib that extends in a first direction generally parallel to the first axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction generally parallel to the second axis along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region; and at least one hardened corner, wherein said at least one hardened corner includes said plurality of first and second conduits wherein adjacent ones of said plurality of conduits contact one another; and means for condensing water from the air stream to be cooled.

* * * * *